United States Patent
Jhoney et al.

(10) Patent No.: US 10,891,654 B2
(45) Date of Patent: Jan. 12, 2021

(54) LOCATION-BASED ADVERTISING USING HYBRID RADIO

(71) Applicant: INTERNATIONAL BUSINESS MACHINES CORPORATION, Armonk, NY (US)

(72) Inventors: Albee Jhoney, Bangalore (IN); Mahantesh S. Meti, Bangalore (IN); Kalpesh Sharma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1016 days.

(21) Appl. No.: 15/064,657

(22) Filed: Mar. 9, 2016

(65) Prior Publication Data

US 2017/0262888 A1 Sep. 14, 2017

(51) Int. Cl.
*G06Q 30/02* (2012.01)
*H04H 20/57* (2008.01)
(Continued)

(52) U.S. Cl.
CPC ....... *G06Q 30/0261* (2013.01); *H04H 20/106* (2013.01); *H04H 20/57* (2013.01);
(Continued)

(58) Field of Classification Search
CPC ........... G06Q 30/0241; G06Q 30/0252; G06Q 30/0261; G06Q 30/0266; H04L 29/08729
See application file for complete search history.

(56) References Cited

U.S. PATENT DOCUMENTS 6,452,498 B2 9/2002 Stewart
6,628,928 B1 9/2003 Crosby et al.
(Continued)

FOREIGN PATENT DOCUMENTS

EP 2388746 A1 11/2011

OTHER PUBLICATIONS

Casagranda et al., "A Framework for a Context-Based Hybrid Content Radio", International Broadcasting Convention 2015, 9 pages.
(Continued)

*Primary Examiner* — Luis A Brown
*Assistant Examiner* — Robert C Johnson
(74) *Attorney, Agent, or Firm* — Michael A. Petrocelli (57) ABSTRACT

A method for generating location-based advertisement includes receiving a selection of a first radio station from a user of a mobile device, receiving an electronic program guide from the first radio station including a plurality of advertisement time slots, where each advertisement time slot in the plurality of advertisement time slots includes an advertisement sequence for a first advertisement content, receiving a second advertisement content from a second radio station located in a geographic location matching a real-time geographic location of the user as determined by a location-based service of the mobile device, substituting the first advertisement content in the advertisement sequence of one of the plurality of advertisement time slots with the second advertisement content from the second radio station, and broadcasting the second advertisement content to the user via the mobile device.

18 Claims, 5 Drawing Sheets

(51) Int. Cl.
  *H04H 20/10* (2008.01)
  *H04W 4/029* (2018.01)
  *H04H 60/72* (2008.01)
  *H04H 60/51* (2008.01)

(52) U.S. Cl.
  CPC ............ *H04W 4/029* (2018.02); *H04H 60/51* (2013.01); *H04H 60/72* (2013.01); *H04H 2201/37* (2013.01)

(56) References Cited

U.S. PATENT DOCUMENTS

| | | | | |
|---|---|---|---|---|
| 6,701,355 | B1* | 3/2004 | Brandt | G06Q 30/02 709/219 |
| 6,816,878 | B1* | 11/2004 | Zimmers | G08B 27/005 340/540 |
| 6,965,580 | B1* | 11/2005 | Takagi | H04B 7/26 370/312 |
| 7,826,444 | B2* | 11/2010 | Irvin | H04H 20/22 370/360 |
| 8,055,540 | B2* | 11/2011 | Pudar | G06Q 30/0269 705/14.62 |
| 8,099,109 | B2 | 1/2012 | Altman et al. | |
| 8,195,203 | B1* | 6/2012 | Tseng | G06Q 10/109 455/457 |
| 2001/0030624 | A1* | 10/2001 | Schwoegler | G01W 1/10 342/357.52 |
| 2001/0034219 | A1 | 10/2001 | Hewitt et al. | |
| 2002/0046084 | A1* | 4/2002 | Steele | H04L 65/4076 705/14.64 |
| 2004/0133467 | A1* | 7/2004 | Siler | G06Q 30/02 705/14.61 |
| 2006/0095331 | A1* | 5/2006 | O'Malley | G06F 16/9574 705/22 |
| 2006/0095348 | A1* | 5/2006 | Jones | G01S 19/13 705/29 |
| 2006/0168185 | A1* | 7/2006 | McCall | G08B 25/016 709/223 |
| 2007/0100806 | A1* | 5/2007 | Ramer | G06F 16/9577 |
| 2008/0214156 | A1* | 9/2008 | Ramer | G06F 16/68 455/414.1 |
| 2008/0214162 | A1* | 9/2008 | Ramer | G06Q 30/02 455/414.2 |
| 2009/0122749 | A1 | 5/2009 | Byun | |
| 2010/0175078 | A1* | 7/2010 | Knudson | H04N 21/4532 725/14 |
| 2010/0179865 | A1* | 7/2010 | Lundgvist | G06Q 30/0241 705/14.4 |
| 2010/0198626 | A1* | 8/2010 | Cho | G06Q 30/0267 705/5 |
| 2011/0106631 | A1* | 5/2011 | Lieberman | G06Q 30/02 705/14.72 |
| 2011/0288917 | A1* | 11/2011 | Wanek | G06Q 30/0252 705/14.5 |
| 2012/0064820 | A1* | 3/2012 | Bemmel | H04L 65/4076 455/3.02 |
| 2013/0125165 | A1* | 5/2013 | Oklejas | H04N 21/2143 725/34 |
| 2013/0311278 | A1* | 11/2013 | Christensen | G11C 7/1066 705/14.49 |
| 2015/0087252 | A1 | 3/2015 | Park et al. | |
| 2016/0182171 | A1* | 6/2016 | Milbar | H04H 20/72 375/259 |

OTHER PUBLICATIONS

YouTube, "RadioDNS Hybrid Radio Introduction and Overview", https://www.youtube.com/watch?v=DQcveCjxrCc, Accessed on Feb. 29, 2016, Published on Jul. 15, 2014, 3 pages.
YouTube, "Hybrid Radio Demo", https://www.youtube.com/watch?v=WAOcKzVPDx4, Accessed on Feb. 29, 2016, Published on Oct. 1, 2012, 3 pages.
Sabel, "Issue 24: Radio's future is Hybrid—What do we need to do?", http://worlddabeureka.org/2014/12/12/radios-future-is-hybrid-what-do-we-need-to-do/, Accessed on Dec. 29, 2015, 8 pages.
Mell et al., "The NIST Definition of Cloud Computing", National Institute of Standards and Technology, U.S. Department of Commerce, Special Publication 800-145, Recommendations of the National Institute of Standards and Technology, Sep. 2011, 7 pages.

* cited by examiner

LOCATION-BASED ADVERTISING USING HYBRID RADIO

BACKGROUND

The present invention generally relates to radio broadcasting, and more particularly, to a method, system and computer program product for generating location-based advertisement using hybrid radio.

Hybrid radio combines the advantages of traditional broadcast radio with those of current internet (IP) technologies to improve the overall radio experience. More specifically, a broadcast signal (e.g. FM signal) may transmit audio (and some data) while using an internet connection, such as Wi-Fi, 3G, 4G, or LTE, to provide multimedia and interactivity functionalities.

SUMMARY

According to one embodiment of the present disclosure, a method for generating location-based advertisement may include receiving a selection of a first radio station from a user of a mobile device, receiving an electronic program guide from the first radio station, the electronic program guide including a plurality of advertisement time slots, where each advertisement time slot in the plurality of advertisement time slots includes an advertisement sequence for a first advertisement content, receiving a second advertisement content from a second radio station located in a geographic location matching a real-time geographic location of the user as determined by a location-based service of the mobile device, substituting the first advertisement content in the advertisement sequence of one of the plurality of advertisement time slots with the second advertisement content from the second radio station, and broadcasting the second advertisement content to the user via the mobile device.

According to another embodiment of the present disclosure, a computer system for generating location-based advertisement may include one or more processors, one or more computer-readable memories, one or more computer-readable tangible storage devices, and program instructions stored on at least one of the one or more storage devices for execution by at least one of the one or more processors via at least one of the one or more memories, where the computer system is capable of performing a method including: receiving a selection of a first radio station from a user of a mobile device, receiving an electronic program guide from the first radio station, the electronic program guide including a plurality of advertisement time slots, where each advertisement time slot in the plurality of advertisement time slots includes an advertisement sequence for a first advertisement content, receiving a second advertisement content from a second radio station located in a geographic location matching a real-time geographic location of the user as determined by a location-based service of the mobile device, substituting the first advertisement content in the advertisement sequence of one of the plurality of advertisement time slots with the second advertisement content from the second radio station, and broadcasting the second advertisement content to the user via the mobile device.

According to another embodiment of the present disclosure, a computer program product for generating location-based advertisement may include a computer readable non-transitory article of manufacture tangibly embodying computer readable instructions which, when executed, cause a computer to carry out a method including: receiving a selection of a first radio station from a user of a mobile device, receiving an electronic program guide from the first radio station, the electronic program guide including a plurality of advertisement time slots, where each advertisement time slot in the plurality of advertisement time slots includes an advertisement sequence for a first advertisement content, receiving a second advertisement content from a second radio station located in a geographic location matching a real-time geographic location of the user as determined by a location-based service of the mobile device, substituting the first advertisement content in the advertisement sequence of one of the plurality of advertisement time slots with the second advertisement content from the second radio station, and broadcasting the second advertisement content to the user via the mobile device.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Currently, an increasing number of people use their mobile devices to listen to radio stations (e.g. FM radio), particularly on the go. Either for entertainment or information purposes, numerous people connect to their favorite radio stations while commuting to work or traveling using a mobile device (e.g. a smartphone). As mentioned above, hybrid radio may further improve a listener's radio experience by combining radio broadcast and the internet. At present, several applications may allow to interactively listen to music/news in mobile devices using hybrid radio;

however, current hybrid radio applications may not include or allow advertisement content corresponding to an immediate or real-time location of the user.

Radio broadcasting companies or commercial radio stations generate most of their profits by selling airtime to advertisers, for that purpose they generally allocate approximately 15 to 20 minutes every hour for paid advertisement. This advertisement space ("airtime") may usually be sold in time slots, for example, 30-second or 1-minute time slots which may be regularly aired during breaks in the radio programming. It should be noted that a substantial number of advertisements may include time and location-sensitive promotional events that may not be of interest to all the listeners. As the vast majority of current mobile devices include some sort of location-based service or functionality (e.g. global positioning system (GPS) or other navigation feature or application), advertisers may take advantage of readily available location services to change or substitute the content of an advertisement time slot according to the specific location of a listener. As such advertising time slots may be more efficiently assigned for profit-generation purposes.

By using location services commonly available in mobile devices, embodiments of the present disclosure, may, among other potential benefits, receive advertisement content based on real-time inputs from mobile location services such that paid advertisement may be broadcast to a more selective target audience.

Embodiments of the present invention generally relate to radio broadcasting, and more particularly, to a method, system and computer program product for generating location-based advertisement using hybrid radio.

Figure 1:
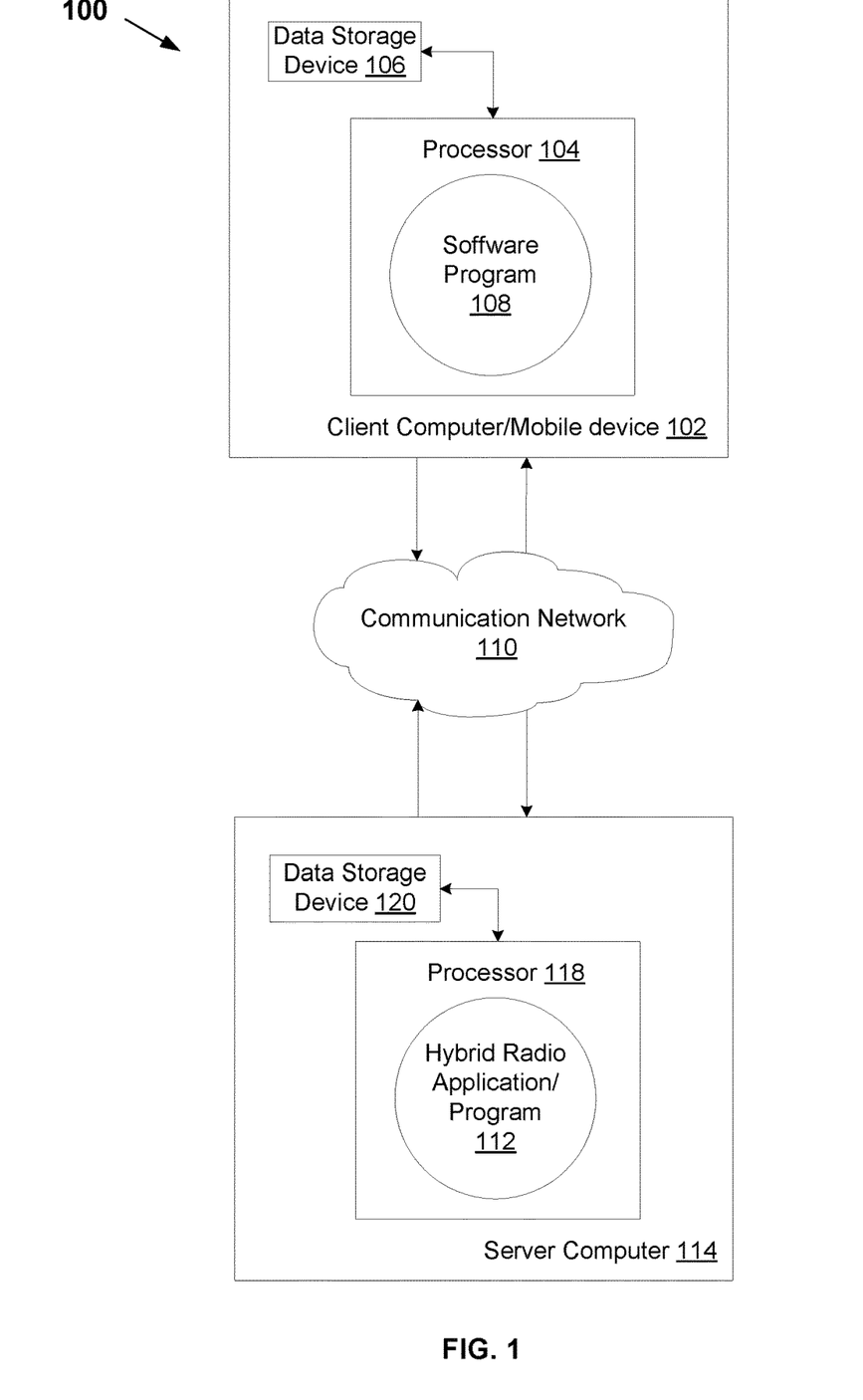
FIG. 1 is a block diagram illustrating a networked computer environment, according to an embodiment of the present disclosure.

Referring now to FIG. 1, an exemplary networked computer environment 100 is depicted, according to an embodiment of the present disclosure. The networked computer environment 100 may include a client computer/mobile device 102 with a processor 104 and a data storage device 106 that is enabled to run a software program 108. The networked computer environment 100 may also include a server computer 114 and a communication network 110. The networked computer environment 100 may include a plurality of client computers/mobile devices 102 and server computers 114, only one of which is shown. The communication network 110 may include various types of communication networks, such as a wide area network (WAN), a local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer/mobile device 102 may communicate with a hybrid radio application/program 112 running on server computer 114 via the communications network 110. The communication network 110 may include connections, such as wire, wireless communication links, or fiber optic cables. As will be discussed with reference to FIG. 3, server computer 114 may include internal components 302a and external components 304a, respectively, and client computer 102 may include internal components 302b and external components 304b, respectively. Client computer/mobile device 102 may be, for example, a mobile device, a telephone (including smartphones), a personal digital assistant, a netbook, a laptop computer, a tablet computer, a desktop computer, an internet-based TV, or any type of computing devices capable of accessing a network. More specifically, the client computer/mobile device 102 may include any type of GPS-enabled computing device capable of accessing a network.

Figure 2:
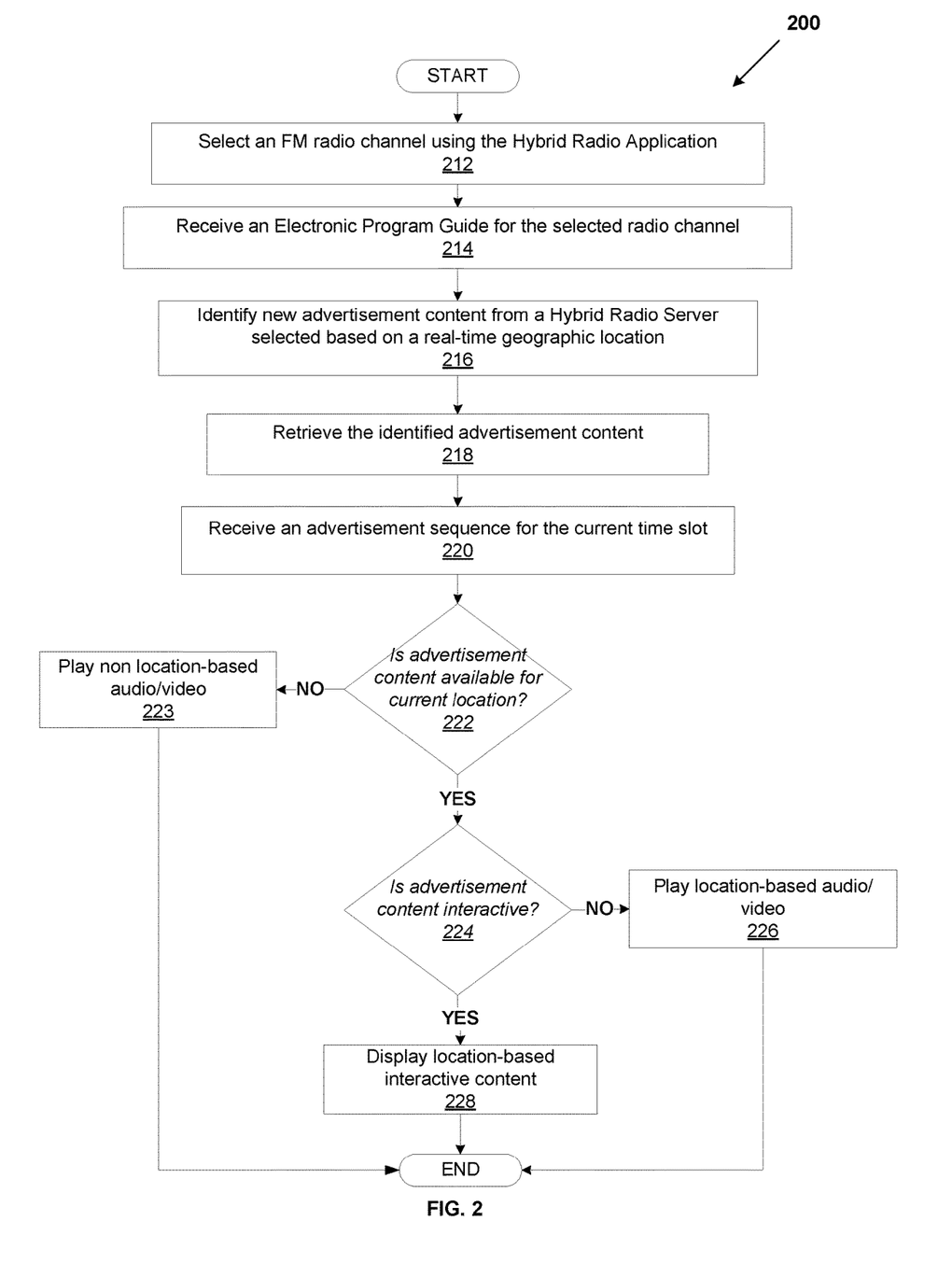
FIG. 2 is a flowchart depicting the steps of a method for generating location-based advertisement using hybrid radio, according to an embodiment of the present disclosure.

Referring now to FIG. 2, a flowchart 200 illustrating the steps of a method for generating location-based advertisement using hybrid radio is shown, according to an embodiment of the present disclosure.

In the depicted embodiment, at 212, a user of a mobile device, such as the client computer/mobile device 102 shown in FIG. 1, selects or tunes a radio station or radio channel (e.g. FM channel) via the Hybrid Radio Application/Program 112 (hereinafter "Hybrid Radio Application"), described in FIG. 1, running on the mobile device. Stated differently, the Hybrid Radio Application 112 (FIG. 1) receives a selection of a radio station from the user of the mobile device.

In one embodiment, the user may select the radio station to listen to a specific show or a favorite program featuring, for example, music, sports, or news. In another embodiment, the user may tune the radio station to general broadcasting for entertainment purposes, for example, while traveling from a first location to a second location, without any particular preference about the content being aired.

As may be known by those skilled in the art, radio stations typically have a programming guide or schedule including a plurality of advertisement time slots specifically intended for paid advertisement, where each advertisement time slot generally includes an advertisement sequence. More specifically, the electronic program guide of the selected radio station may include a timeline of reserved and/or available airtime for paid advertisement.

The Hybrid Radio Application 112 (FIG. 1), at 214, receives an available electronic program guide for the selected radio station and uses this information to include new advertisement content corresponding to a real-time geographic location of the user as determined by a location-based service of the mobile device, as will be described in detail below. In some embodiments, the Hybrid Radio Application 112 (FIG. 1) receives an available electronic program guide from the radio station selected by the user using any technology and/or method known in the art.

Generally, the Hybrid Radio Application 112 (FIG. 1) assumes that the electronic program guide contains a pre-defined schedule time-sliced for songs, radio host or program anchor, radio programs, and advertisements. Such advertisements may include, for example, a pre-recorded advertisement and live content from a program anchor.

Information about available advertisement time-slots may also be accessible via the Internet to the Hybrid Radio Application 112 (FIG. 1). In some embodiments, the Hybrid Radio Application 112 (FIG. 1) may be running on a smartphone or a custom Hybrid FM Receiver device in which switching from one time slot to another may be performed automatically by the Hybrid Radio Application 112 (FIG. 1) with no or minimal intervention from the user.

At 216, the Hybrid Radio Application 112 (FIG. 1) receives new advertisement content from one or more hybrid radio servers (such as the server computer 114 shown in FIG. 1) available for the user's current geographic location. The Hybrid Radio Application 112 (FIG. 1) via the mobile device location service (e.g. GPS service) determines a real-time location of the user, then, based on the determined location, the Hybrid Radio Application 112 (FIG. 1) selects and connects to an available hybrid radio server which may contain new advertisement content generally associated to local advertisements, i.e., advertisement content corresponding or related to a current geographic location of the user.

Stated differently, a program anchor or radio host from a local radio station uses a hybrid radio server available in his/her location or area to broadcast targeted advertisement content. The Hybrid Radio Application 112 (FIG. 1) connects to a hybrid radio server containing local advertisement content made available by, for example, a radio station (or program anchor) located near the determined geographic location of the user. For instance, a radio host in New York City uses an available hybrid radio server in the area to advertise the opening of a new coffee shop in Manhattan, the Hybrid Radio Application 112 (FIG. 1) connects to the hybrid radio server and receives such advertisement content which is then delivered to users of the application located nearby this geographic location.

In other embodiments, it is conceivable for the user to connect via the Hybrid Radio Application 112 (FIG. 1) to a hybrid radio server containing local advertisement content made available by, for example, a radio station (or program anchor) from a geographic location different from the user's geographic location, as determined by location service on the user's mobile device.

It should be noted that, in some embodiments, a program anchor or radio host may be located, for example, in a business establishment (such as a shopping center) where he/she focuses on advertising sales or events to an audience in order to attract potential customers to such location. In such embodiments, the program anchor may, using a local hybrid radio server, publish an advertisement content which may then be retrieved by the Hybrid Radio Application 112 (FIG. 1) and broadcast to the user.

Integrating the location-based service available in the mobile device enables the Hybrid Radio Application 112 (FIG. 1) to communicate with a hybrid radio server selected based on a real-time geographic location of the user as determined by the location-based service of the mobile device. The Hybrid Radio Application 112 (FIG. 1) may then retrieve or receive from the hybrid radio server advertisement content specifically related to the real-time location of the user. As described above, this advertisement content may be made available via the Internet by, for example, a radio host or program anchor of a local radio station. By doing this, location-based advertisement may be broadcast to the user during the available airtime or time slots previously identified at 214.

Consequently, at 218, the Hybrid Radio Application 112 (FIG. 1) stores or retrieves the identified advertisement content corresponding to the determined real-time location of the user. In some embodiments, the identified advertisement content (218) may include repetitive advertising material (e.g. repetition advertisement) which facilitates caching and reusing the identified advertisement content.

In some embodiments, as the user moves from a first location to a second location, the Hybrid Radio Application 112 (FIG. 1) connects to another hybrid radio server selected based on the immediate location of the user, as such the Hybrid Radio Application 112 (FIG. 1) may receive new advertisement content corresponding to the second location.

It should be noted that the Hybrid Radio Application 112 (FIG. 1) may provide a seamless transition (no overlap) of the content being aired when the user moves from the first location to the second location.

At 220, after retrieving the identified advertisement content (218), the Hybrid Radio Application 112 (FIG. 1) receives an advertisement sequence for the current time slot. It should be noted that the received advertisement sequence may generally include information regarding an advertisement schedule for a current time slot or airtime, including reserved or available time for advertisement. In some embodiments the advertisement sequence may be provided by a radio host or program anchor of the broadcasting radio station. In some embodiments, the Hybrid Radio Application 112 (FIG. 1) fetches or receives an advertisement sequence for a currently available time slot using any technology and/or method known in the art.

At 222, if advertisement content is available for the user's current location, the process continues at 224 where it is determined if the content of the advertisement is interactive (i.e. may respond to the user's actions by presenting text, images, animation, video, audio, and/or games). If the advertisement content is interactive then the Hybrid Radio Application 112 (FIG. 1) displays at 228 the interactive content corresponding to the determined real-time location of the user.

In some embodiments, the Hybrid Radio Application 112 (FIG. 1) may display the interactive content in a separate window to facilitate communication with the user. More specifically, when interactive content is available, the Hybrid Radio Application 112 (FIG. 1) may open any relevant visual interface which may help the user to interact with the content presented, for example, participate in a survey, play an interactive game with the radio host/program anchor, etc.

If the advertisement content at 224 is not interactive then the Hybrid Radio Application 112 (FIG. 1) plays prerecorded audio or video advertisement at 226 corresponding to the current geographic location of the user.

Non-interactive content including pre-recorded audio, may be made available by a radio host/program anchor via the hybrid radio server to an audience traveling or located in the vicinity of a particular zone, as previously described. Based on a real-time geographic location of at least one listener (audience) determined via a location-based service of the mobile device, the Hybrid Radio Application 112 (FIG. 1) may automatically tune to the appropriate hybrid radio server to pre-fetch and cache the non-interactive content. Consequently, the Hybrid Radio Application 112 (FIG. 1) plays this non-interactive content based on the pre-determined schedule following the method described above.

In some embodiments, non-interactive content may consist of, for example, pre-recorded audios or videos including advertisement for local businesses or events. In other embodiments, the non-interactive content may include, for example, traffic alerts, a message from a local authority, or information about weather forecast as will be described in detail below.

If at 222, advertisement content is not available for the determined real-time location of the user, then the Hybrid Radio Application 112 (FIG. 1) plays a general prerecorded audio or video advertisement at 223 which is not related to the user's current geographic location. In some embodiments, an original advertisement sequence of a current time slot of the broadcasting station may remain unchanged when location-based advertisement is not available.

The Hybrid Radio Application 112 (FIG. 1) focuses on combining a regular FM advertisement program of a first radio station tuned by an audience with a location-based advertisement content corresponding to a second (local) radio station, such that the audience of the first radio station, via the Hybrid Radio Application 112 (FIG. 1), receives advertisement content related to its real-time geographic location as determined by the location-based service of the mobile device. More specifically, an advertisement content from a second radio station located at a geographic location matching the real-time geographic location of the user can be received via the Internet by the Hybrid Radio Application 112 (FIG. 1) and delivered to the audience during a pre-defined advertisement time slot.

Moreover, the Hybrid Radio Application 112 (FIG. 1) receives FM content presented by a first (primary) radio host/program anchor of a first radio station and location-based advertisement content presented by a second radio host/program anchor of a second (local) radio station over an Internet channel. The Hybrid Radio Application 112 (FIG. 1) then includes the location-based advertisement content in an advertisement sequence of a currently available time slot of the first radio station.

The Hybrid Radio Application 112 (FIG. 1) may typically combine both an FM-based broadcast channel and an IP-based interactive channel for providing an improved advertising experience. The interaction with local radio hosts or anchors via the Hybrid Radio Application 112 (FIG. 1) may facilitate the transmission of live updates on local events or promotions. By facilitating the incorporation of local advertisement, the Hybrid Radio Application 112 (FIG. 1) may serve as a communication channel for public authorities and services (e.g. police, emergency services, fire stations, weather stations) to provide real-time notifications to all the listeners in or near a particular location about special circumstances or events.

Additionally the Hybrid Radio Application 112 (FIG. 1) may be capable of providing visual updates by displaying useful or relevant information (e.g. location of a social event or emergency situation) regarding local events broadcast by a radio host or public authorities via the mobile device location services (e.g. global positioning system, map or navigation applications). Stated differently, the Hybrid Radio Application 112 (FIG. 1) may provide a visual update of one or more events occurring in the real-time geographic location of the user.

Therefore, embodiments of the present disclosure may, allow real-time interaction between an audience of a FM radio station with a radio host or anchor within the Hybrid Radio Application 112 (FIG. 1), allow radio hosts or anchors to control the advertisement content being delivered to their audience (either en-route or within a specified location), allow broadcasting time and location-sensitive promotional events (e.g. alerts or gift coupons) to encourage listeners to visit a nearby location. Additionally, advertisement content may be downloaded and stored in the Hybrid Radio Application 112 (FIG. 1) by the user. Moreover, an advertisement sequence for each advertisement time slot may also be downloaded and stored in the mobile device in addition to the advertisement content. As such, the Hybrid Radio Application 112 (FIG. 1) may allow sponsors/advertisers to optimize advertisement cost and improve business opportunities for the broadcaster, shopping establishments, etc.

Moreover, the Hybrid Radio Application 112 (FIG. 1) may allow public service authorities (traffic police, ambulance) to interleave messages to fore-warn listeners about time and location-sensitive events that encourage them to take adequate precaution.

Figure 3:
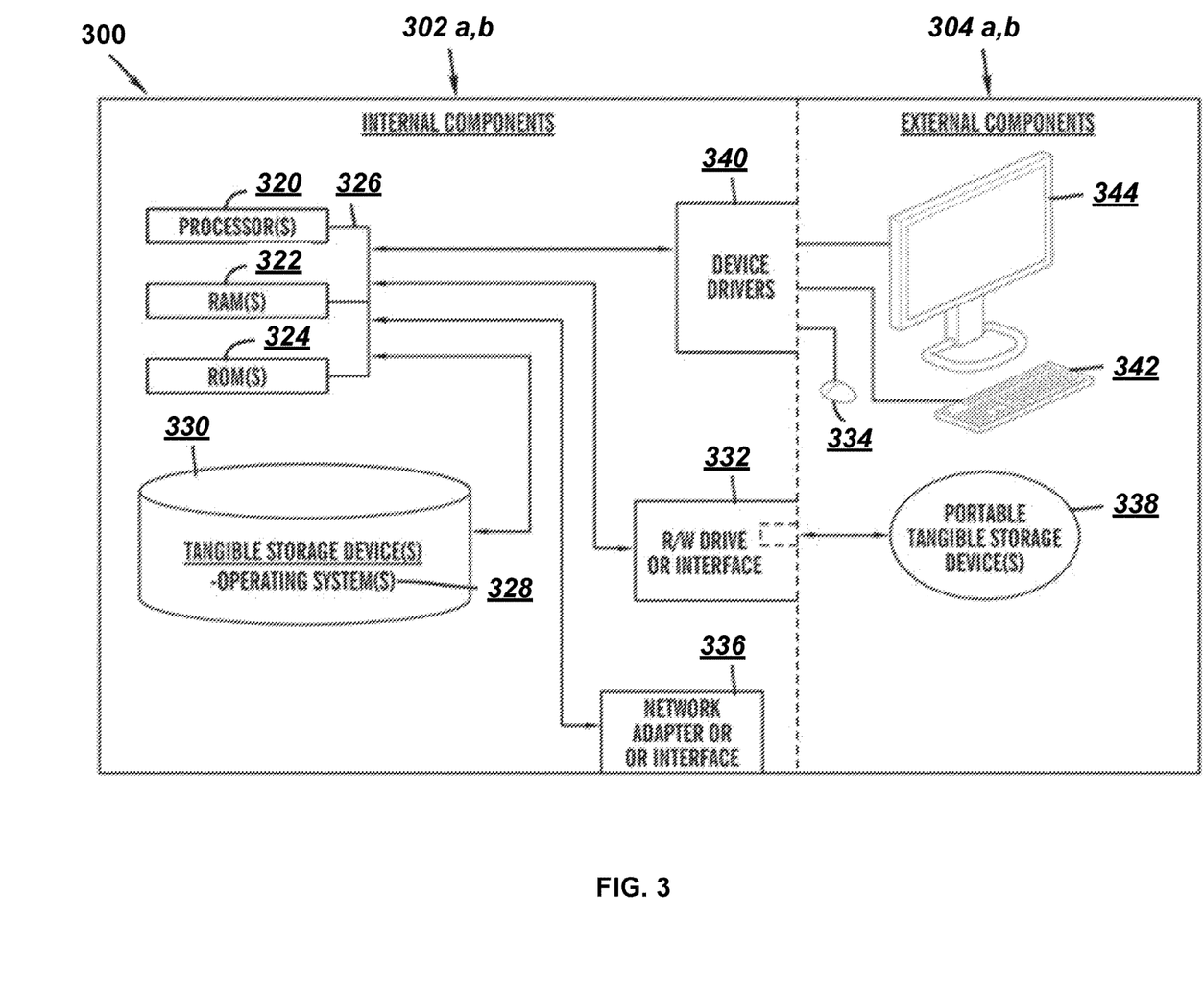
FIG. 3 is a block diagram of internal and external components of computers and servers depicted in FIG. 1, according to an embodiment of the present disclosure.

Referring now to FIG. 3, a block diagram 300 of internal and external components of computers depicted in FIG. 1 is shown according to an embodiment of the present disclosure. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 302, 304 is representative of any electronic device capable of executing machine-readable program instructions. Data processing system 302, 304 may be representative of a smart phone, a computer system, PDA, or other electronic devices. Examples of computing systems, environments, and/or configurations that may represented by data processing system 302, 304 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computer/mobile device 102 (FIG. 1) and server computer 114 (FIG. 1) may include respective sets of internal components 302a,b and external components 304a,b illustrated in FIG. 3. Each of the sets of internal components 302 include one or more processors 320, one or more computer-readable RAMs 322 and one or more computer-readable ROMs 324 on one or more buses 326, and one or more operating systems 328 and one or more computer-readable tangible storage devices 330. The software program 108 in client computer 102 (FIG. 1) and the hybrid radio application/program 112 in the server computer 114 (FIG. 1) are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. Software programs, such as the first and second plurality of modules described above can be stored on one or more of the respective portable computer-readable tangible storage devices 338, read via the respective R/W drive or interface 332 and loaded into the respective hard drive 330.

Each set of internal components 302a,b also includes network adapters or interfaces 336 such as a TCP/IP adapter cards, wireless Wi-Fi interface cards, or 3G or 4G wireless interface cards or other wired or wireless communication links. The software program 108 in client computer 102 (FIG. 1) and the hybrid radio application/program 112 in the server computer 114 (FIG. 1) can be downloaded to the client computer 102 (FIG. 1) and server computer 114 (FIG. 1) from an external computer via a network (for example, the Internet, a local area network or other, wide area network) and respective network adapters or interfaces 336. From the network adapters or interfaces 336, the software program 108 in client computer 102 (FIG. 1) and the hybrid radio application/program 112 in the server computer 114 (FIG. 1) are loaded into the respective hard drive 330. The network may include copper wires, optical fibers, wireless transmission, routers, firewalls, switches, gateway computers and/or edge servers.

Each of the sets of external components 304a,b can include a computer display monitor 344, a keyboard 342, and a computer mouse 334. External components 304a,b can also include touch screens, virtual keyboards, touch pads, pointing devices, and other human interface devices. Each of the sets of internal components 302a,b also includes device drivers 340 to interface to computer display monitor 344, keyboard 342 and computer mouse 334. The device drivers 340, R/W drive or interface 332 and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
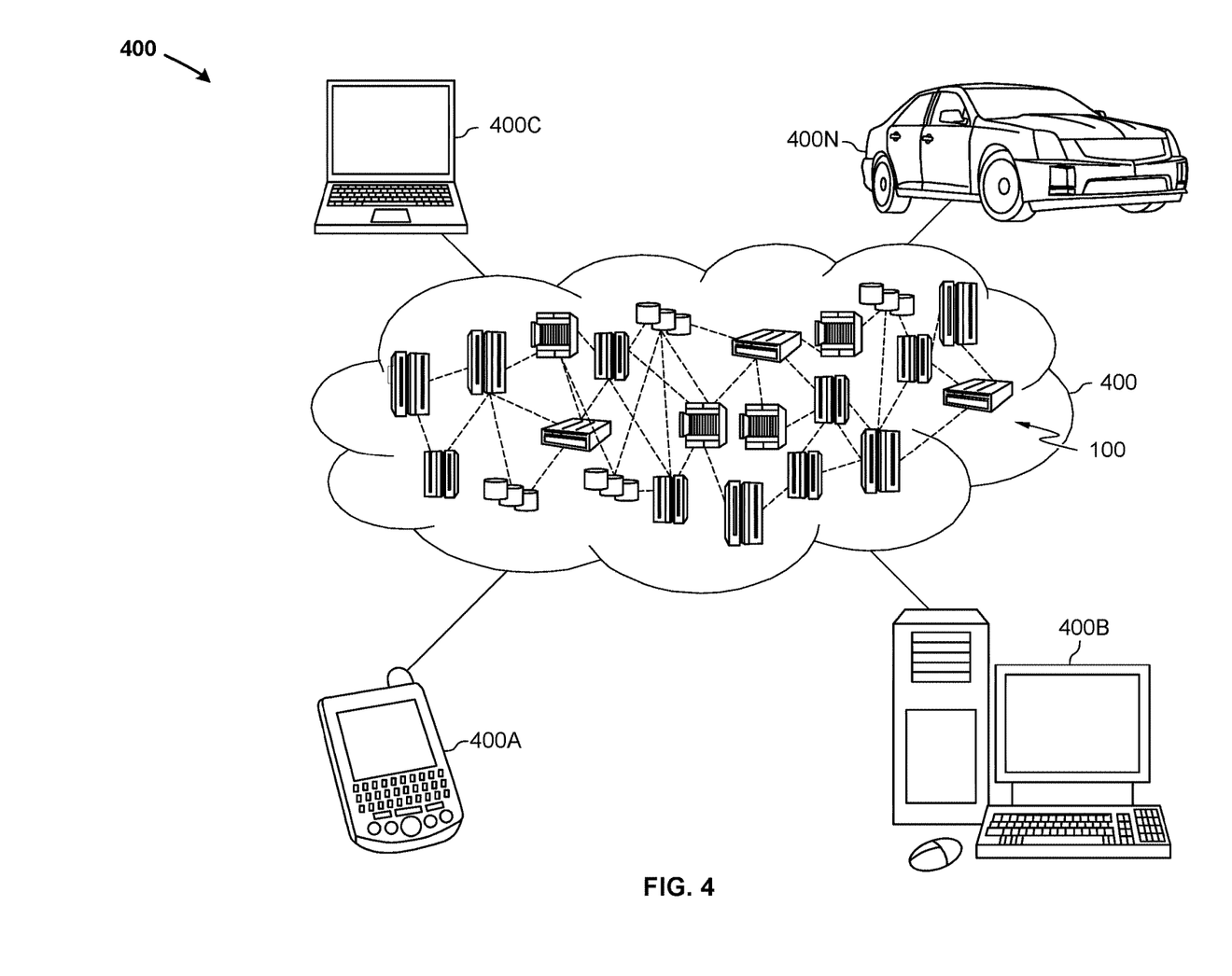
FIG. 4 is a block diagram of an illustrative cloud computing environment including the computer system depicted in FIG. 1, according to an embodiment of the present disclosure.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
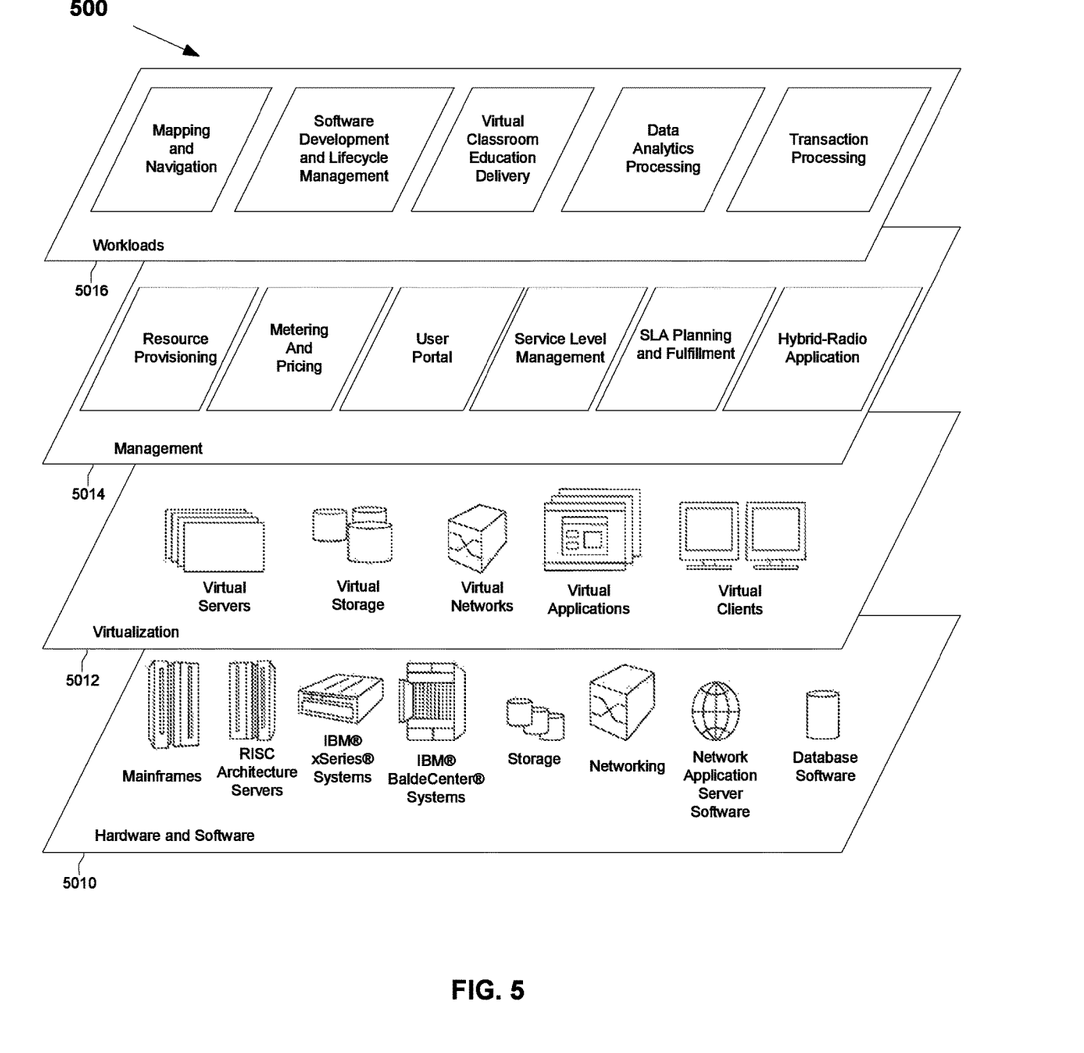
FIG. 5 is a block diagram of functional layers of the illustrative cloud computing environment of FIG. 4, according to an embodiment of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 5010 includes hardware and software components. Examples of hardware components include: mainframes; RISC (Reduced Instruction Set Computer) architecture based servers; storage devices; networks and networking components. In some embodiments, software components include network application server software.

Virtualization layer 5012 provides an abstraction layer from which the following examples of virtual entities may be provided: virtual servers; virtual storage; virtual networks, including virtual private networks; virtual applications and operating systems; and virtual clients.

In one example, management layer 5014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A program for generating location-based advertisement using hybrid radio.

Workloads layer 5016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for generating location-based advertisement comprising:
   receiving, by a processor of a mobile device, a selection of a first radio station from a user of the mobile device;
   receiving, by the processor, an electronic program guide from the first radio station, the electronic program guide comprising a plurality of advertisement time slots, wherein each advertisement time slot in the plurality of advertisement time slots comprises an advertisement sequence for a first advertisement content;
   determining, by the processor, a real-time geographic location of the user using a location-based service of the mobile device, the location-based service comprising a global positioning system;
   connecting to a hybrid radio server available within a geographic location matching the real-time geographic location of the user;
   receiving, by the processor, via the hybrid radio server a second advertisement content from a second radio station located in the geographic location matching the real-time geographic location of the user as determined by the location-based service of the mobile device, the second advertisement content comprising non-interactive content including at least one of a pre-recorded audio and videos associated to the real-time geographic location of the user, wherein the non-interactive content is made available to the mobile device by a radio host via the hybrid radio server during a time the real-time location of the user matches the geographic location, wherein based on the real-time geographic location of the user determined via the location-based service of the mobile device, the hybrid radio server is automatically tune to pre-fetch and cache the non-interactive content;
   substituting, by the processor, the first advertisement content in the advertisement sequence of one of the plurality of advertisement time slots with the second advertisement content from the second radio station;
   broadcasting, by the processor, the second advertisement content to the user via the mobile device; and
   based on substituting the first advertisement content with the second advertisement content from the second radio station, providing, by the processor, real-time notifications to the user associated with one or more events occurring in the geographic location matching the real-time geographic location of the user, the one or more events comprising at least one of local alerts, promotions, traffic conditions, weather and emergency situations.

2. The method of claim 1, wherein the location-based service of the mobile device further comprises a navigation application or a map application.

3. The method of claim 1, wherein the second advertisement content comprises an interactive content associated to the real-time geographic location of the user.

4. The method of claim 1, wherein broadcasting the second advertisement content to the user via the mobile device comprises:
   providing a visual update associated with the one or more events occurring in the real-time geographic location of the user.

5. The method of claim 1, further comprising:
   downloading, to the mobile device, the second advertisement content; and
   storing the second advertisement content in the mobile device.

6. The method of claim 1, further comprising:
   downloading, to the mobile device, the advertisement sequence for each advertisement time slot in the plurality of advertisement time slots; and
   storing the advertisement sequence in the mobile device.

7. The method of claim 1, further comprising:
   selecting the hybrid radio server based on the real-time geographic location of the user as determined by the location-based service of the mobile device, wherein the hybrid radio server contains the second advertisement content; and
   in response to the user moving to a new geographic location, detecting a new real-time location of the user and connecting to a new hybrid radio server available within the new geographic location, the new hybrid radio server selected based on the new real-time location of the user matching the new geographic location such that a new advertisement content corresponding to the new location is broadcasted to the user.

8. A computer system for generating location-based advertisement comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
receiving, by a processor of a mobile device, a selection of a first radio station from a user of the mobile device;
receiving, by the processor, an electronic program guide from the first radio station, the electronic program guide comprising a plurality of advertisement time slots, wherein each advertisement time slot in the plurality of advertisement time slots comprises an advertisement sequence for a first advertisement content;
determining, by the processor, a real-time geographic location of the user using a location-based service of the mobile device, the location-based service comprising a global positioning system;
connecting to a hybrid radio server available within a geographic location matching the real-time geographic location of the user;
receiving, by the processor, via the hybrid radio server a second advertisement content from a second radio station located in the geographic location matching the real-time geographic location of the user as determined by the location-based service of the mobile device, the second advertisement content comprising non-interactive content including at least one of a pre-recorded audio and videos associated to the real-time geographic location of the user, wherein the non-interactive content is made available to the mobile device by a radio host via the hybrid radio server during a time the real-time location of the user matches the geographic location, wherein based on the real-time geographic location of the user determined via the location-based service of the mobile device, the hybrid radio server is automatically tune to pre-fetch and cache the non-interactive content;
substituting, by the processor, the first advertisement content in the advertisement sequence of one of the plurality of advertisement time slots with the second advertisement content from the second radio station;
broadcasting, by the processor, the second advertisement content to the user via the mobile device; and
based on substituting the first advertisement content with the second advertisement content from the second radio station, providing, by the processor, real-time notifications to the user associated with one or more events occurring in the geographic location matching the real-time geographic location of the user, the one or more events comprising at least one of local alerts, promotions, traffic conditions, weather and emergency situations.

9. The computer system of claim 8, wherein the location-based service of the mobile device further comprises a navigation application or a map application.

10. The computer system of claim 8, wherein the second advertisement content comprises an interactive content associated to the real-time geographic location of the user.

11. The computer system of claim 8, wherein broadcasting the second advertisement content to the user via the mobile device comprises:
providing a visual update associated with the one or more events occurring in the real-time geographic location of the user.

12. The computer system of claim 8, further comprising:
downloading, to the mobile device, the second advertisement content; and
storing the second advertisement content in the mobile device.

13. The computer system of claim 8, further comprising:
downloading, to the mobile device, the advertisement sequence for each advertisement time slot in the plurality of advertisement time slots; and
storing the advertisement sequence in the mobile device.

14. The computer system of claim 8, further comprising:
selecting the hybrid radio server based on the real-time geographic location of the user as determined by the location-based service of the mobile device, wherein the hybrid radio server contains the second advertisement content; and
in response to the user moving to a new geographic location, detecting a new real-time location of the user and connecting to a new hybrid radio server available within the new geographic location, the new hybrid radio server selected based on the new real-time location of the user matching the new geographic location such that a new advertisement content corresponding to the new location is broadcasted to the user.

15. A computer program product for generating location-based advertisement comprising:
a computer readable non-transitory article of manufacture tangibly embodying computer readable instructions which, when executed, cause a computer to carry out a method comprising:
receiving, by a processor of a mobile device, a selection of a first radio station from a user of the mobile device;
receiving, by the processor, an electronic program guide from the first radio station, the electronic program guide comprising a plurality of advertisement time slots, wherein each advertisement time slot in the plurality of advertisement time slots comprises an advertisement sequence for a first advertisement content;
determining, by the processor, a real-time geographic location of the user using a location-based service of the mobile device, the location-based service comprising a global positioning system;
connecting to a hybrid radio server available within a geographic location matching the real-time geographic location of the user;
receiving, by the processor, via the hybrid radio server a second advertisement content from a second radio station located in the geographic location matching the real-time geographic location of the user as determined by the location-based service of the mobile device, the second advertisement content comprising non-interactive content including at least one of a pre-recorded audio and videos associated to the real-time geographic location of the user, wherein the non-interactive content is made available to the mobile device by a radio host via the hybrid radio server during a time the real-time location of the user matches the geographic location, wherein based on the real-time geographic location of the user determined via the location-based service of the mobile device, the hybrid radio server is automatically tune to pre-fetch and cache the non-interactive content;

substituting, by the processor, the first advertisement content in the advertisement sequence of one of the plurality of advertisement time slots with the second advertisement content from the second radio station;

broadcasting, by the processor, the second advertisement content to the user via the mobile device; and based on substituting the first advertisement content with the second advertisement content from the second radio station, providing, by the processor, real-time notifications to the user associated with one or more events occurring in the geographic location matching the real-time geographic location of the user, the one or more events comprising at least one of local alerts, promotions, traffic conditions, weather and emergency situations.

16. The computer program product of claim 15, wherein broadcasting the second advertisement content to the user via the mobile device comprises:

providing a visual update associated with the one or more events occurring in the real-time geographic location of the user.

17. The computer program product of claim 15, further comprising:

downloading, to the mobile device, the second advertisement content; and storing the second advertisement content in the mobile device.

18. The computer program product of claim 15, further comprising:

selecting the hybrid radio server based on the real-time geographic location of the user as determined by the location-based service of the mobile device, wherein the hybrid radio server contains the second advertisement content; and in response to the user moving to a new geographic location, detecting a new real-time location of the user and connecting to a new hybrid radio server available within the new geographic location, the new hybrid radio server selected based on the new real-time location of the user matching the new geographic location such that a new advertisement content corresponding to the new location is broadcasted to the user.

* * * * *